United States Patent [19]
Gorans et al.

[11] Patent Number: 5,651,731
[45] Date of Patent: Jul. 29, 1997

[54] METHOD AND APPARATUS FOR DEBEAKING POULTRY

[75] Inventors: Marc S. Gorans, Willmar; Scott C. Johnson, Blomkest, both of Minn.

[73] Assignee: Nova-Tech Engineering, Inc., Willmar, Minn.

[21] Appl. No.: 493,928

[22] Filed: Jun. 23, 1995

[51] Int. Cl.⁶ .................................................. A22C 21/00
[52] U.S. Cl. .................................................. 606/164; 452/166
[58] Field of Search ........................... 452/166, 71, 198; 128/303.14

[56] References Cited

U.S. PATENT DOCUMENTS

| | | |
|---|---|---|
| Re. 31,202 | 4/1983 | Goodling et al. ............. 128/303.14 |
| 2,448,421 | 8/1948 | Davis . |
| 2,484,088 | 11/1949 | Hayes . |
| 2,501,283 | 3/1950 | McKnight . |
| 2,505,559 | 4/1950 | Lyon . |
| 2,713,325 | 7/1955 | Bowers . |
| 2,731,016 | 1/1956 | Miller . |
| 2,742,904 | 4/1956 | Lyon . |
| 2,792,004 | 5/1957 | Sandy . |
| 2,952,031 | 9/1960 | Breitkreutz . |
| 3,136,315 | 6/1964 | Lyon . |
| 3,274,974 | 9/1966 | Reynolds . |
| 3,295,524 | 1/1967 | Parker . |
| 3,302,645 | 2/1967 | Lockmiller . |
| 3,502,079 | 3/1970 | Simmons et al. . |
| 3,570,487 | 3/1971 | Reynolds . |
| 3,593,714 | 7/1971 | Lyon . |
| 3,623,186 | 11/1971 | Panek . |
| 3,964,481 | 6/1976 | Gourlandt et al. . |
| 3,994,292 | 11/1976 | Goodwin . |
| 4,019,513 | 4/1977 | Kaniecki . |
| 4,026,289 | 5/1977 | Hendrix . |
| 4,040,425 | 8/1977 | Goodling et al. . |
| 4,177,810 | 12/1979 | Gourlandt . |
| 4,191,130 | 3/1980 | Musgrave . |
| 4,343,310 | 8/1982 | DuBose et al. ............. 128/303.14 |
| 4,375,814 | 3/1983 | Gourlandt . |
| 4,446,819 | 5/1984 | Gourlandt . |
| 4,681,565 | 7/1987 | Gourlandt . |
| 4,951,610 | 8/1990 | Gourlandt . |
| 5,195,925 | 3/1993 | Gorans ............................ 452/166 |

FOREIGN PATENT DOCUMENTS

| | | |
|---|---|---|
| 2281060 | 3/1976 | France . |
| 2620258 | 2/1977 | Germany . |
| 2722811A1 | 11/1978 | Germany . |

*Primary Examiner*—Willis Little
*Attorney, Agent, or Firm*—Palmatier, Sjoquist, Helget & Voigt, P.A.

[57] ABSTRACT

The present invention relates to debeaking turkey and chick poultry through non-contact thermal transfer from a source of high frequency heat generating radiation. The present invention directs heat onto the upper beak of a live bird by convection or radiation to thereby affect the continued growth of the beak. Such heating of the bird's upper beak provides a debeaking method which allows the bird's upper beak to stay in place for several days allowing the bird to eat and drink. Heating the portion of the upper beak also allows the poultry tongue and lower beak to be shielded from the heat causing less trauma and injury to the bird. The heat may be directed onto the poultry upper beak by radiation or convection.

29 Claims, 6 Drawing Sheets

METHOD AND APPARATUS FOR DEBEAKING POULTRY

BACKGROUND OF THE INVENTION

The present invention relates to debeaking turkey, chicken and other poultry through non-contact thermal transfer from a source of high frequency heat generating radiation. The beak of a bird is a weapon and a tool for eating. In commercial production, poultry are raised in close proximity to each other. In this environment, young bird's may use their beaks for pecking other birds thus causing disfigurement or death. The sharp tip of the beak is the most lethal part of the beak. In addition, adult poultry may use their beaks as weapons to damage other adult and juvenile poultry. This use of the beak as a weapon causes economic loses for the poultry producer. Accordingly, a portion of the beak is removed from poultry to minimize its effectiveness as a weapon.

Previously, debeaking methods were based on the principle of killing all tissue just ahead of the nostril by severing the blood supply and generally destroying the tissue of the beak. This was done through cutting the beak with a blade or by bringing the beak in contact with a hot object to burn through the beak. Although bleeding may be minimized by cauterization, the wound resulting from these processes produced a substantial amount of pain and shock in the bird.

In using these prior art processes, precision positioning of the beak and ineffectiveness of the method used resulted in several disadvantages over Applicant's invention. The beak may heal and regenerate if the blood supply to the beak is not completely cut. Furthermore, when the veins are cut close to the nostril, they are large and difficult to seal resulting in problems avoiding infection or bleeding. The prior art method also induce severe shock and pain to the bird.

SUMMARY OF THE INVENTION

A feature of the present invention is the provision in the processing of live poultry, of killing a portion of the top beak of a bird by non-contact thermal transfer, causing the killed portion of the beak to erode away a number of days subsequent to the heating.

Another feature is a method of processing live poultry by heating a portion of the top beak while shielding the lower beak and the tongue against damage or injury.

Another feature is a method of processing live poultry by exposing the top beak to heat by reflection, convection or laser.

Another feature is the provision in an apparatus for securing the bird's head in a particular position and protecting the head. Another feature is the provision in such an apparatus for shielding the bird's eyes and nostrils from scattered energy. A still further feature is a provision in an apparatus to position the beak for precise debeaking.

Another feature is the provision in an apparatus for precisely locating the portion of the beak to be heated and directing the heat onto the portion of the beak.

An advantage of the present invention is that it provides a more humane method for debeaking poultry because the method is bloodless, induces little or no shock and minimizes damage to the bird.

Another advantage of the invention is the non-contact method allowing more tolerance in beak size variation. Another advantage is that the depth of penetration of the high frequency heat generating radiation is fairly uniform resulting in damage to the interior of the beak being most severe at the tip and reducing as the beak gets thicker towards the bird's nostril.

Another advantage is that a bird retains the portion of the top beak killed by the heat for one to two weeks to help the bird learn to eat and drink before the exposed beak structure is lost. Another advantage is that the invention allows the bird to retain its lower beak which helps in eating and drinking.

Another advantage is the depth of penetration of the radiated heat into the beak is controllable by adjusting the power rate and exposure time to damage the cells of the beak enough to prevent the beak from getting sharp again during the next 8–22 weeks.

DETAILED SPECIFICATION

Figure 1:
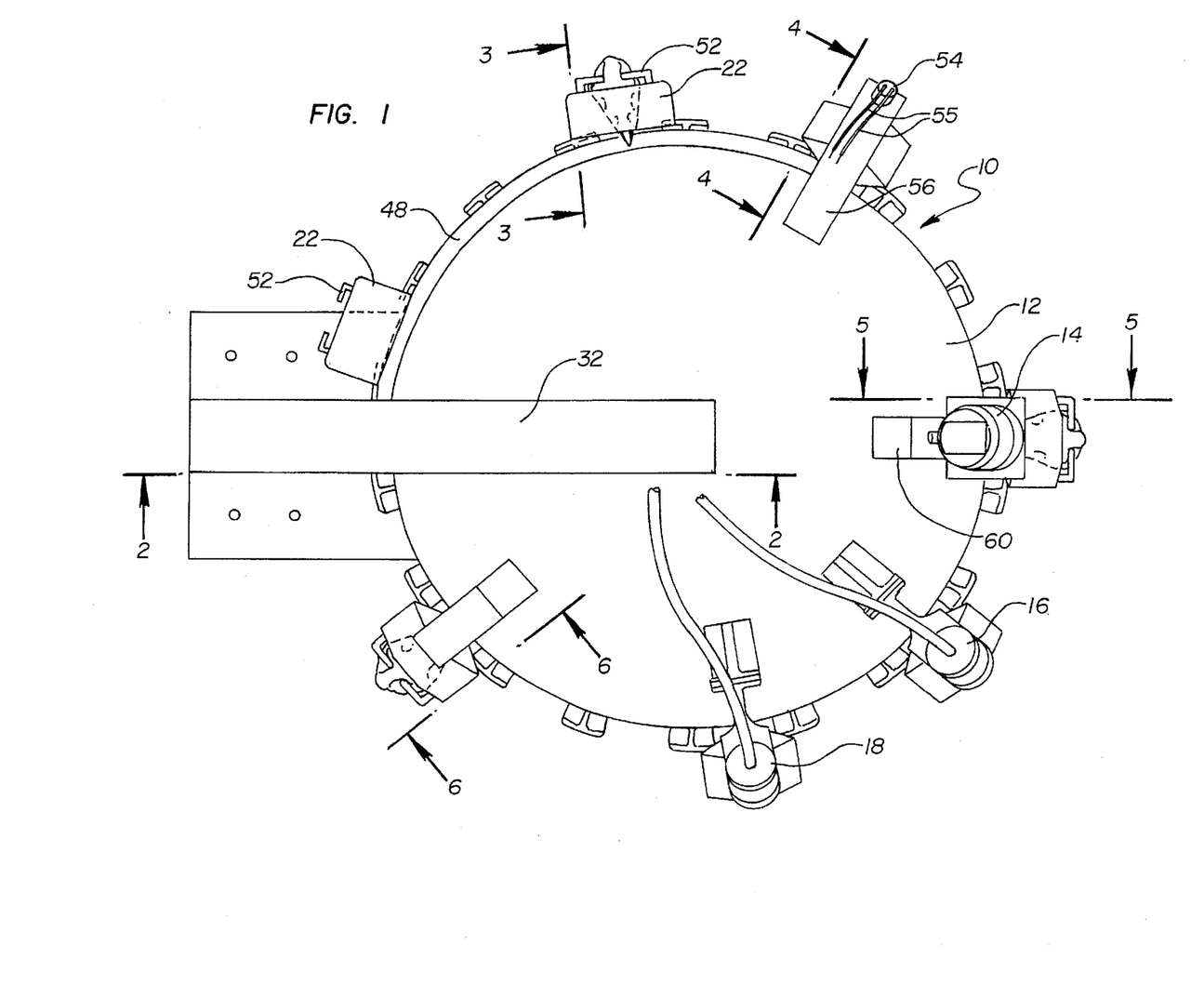
FIG. 1 is a plan view of a bird processing apparatus with a debeaking station.

An apparatus for processing live poultry indicated in general by the numeral 10 is shown in FIG. 1. A mounting plate 12 supports debeaking station 14, liquid injection station 16 and pellet injection station 18. Poultry P are secured in the bird head positioning device 22 and are conveyed to the debeaking station 14 before being unloaded from the head positioning device 22.

Figure 2:
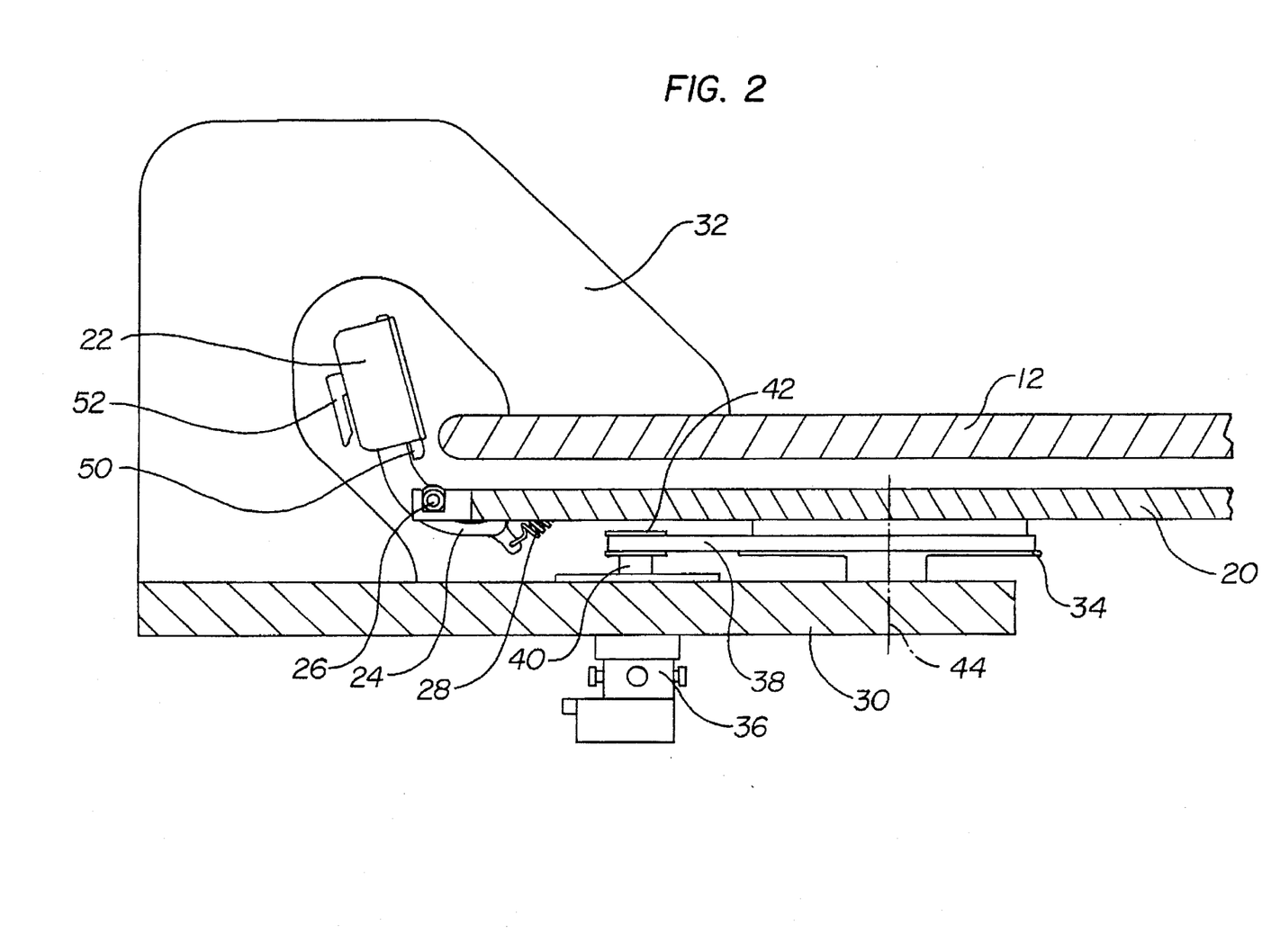
FIG. 2 is a detail section view taken at approximately 2—2 of FIG. 1.

FIG. 2 illustrates a detail section view of the mounting arrangement between mounting plate 12 and platform 20. The bird head positioning device 22 is attached to platform 20 by rocker arm 24 which is pivotally connected to platform 20 at head pin 26. Spring 28 connects to rocker arm 24 to urge rocker arm 24 in a predetermined position about head pin 26. Spring 28 is connected to rocker arm 24 and platform 20 and will flex to allow rocker arm 24 to pivot about head pin 26. Platform 20 is rotatably mounted on base plate 30.

Mounting plate 12 is attached to mounting arch 32. Processing stations 14, 16, 18 are mounted on plate 12. Platform 20 is connected to drive pulley 34 of shaft 30. Drive pulley 34 is connected to drive motor 36 by drive belt 38. Drive motor 36 is mounted on mounting plate 12 to allow drive motor 36 to rotate drive shaft 40 turning motor pulley 42 which is connected to drive pulley 34 with drive belt 38. As should be understood, drive motor 36 will rotate motor pulley 42 which causes drive belt 38 to transfer the rotatory motion to drive pulley 34 causing platform 20 to rotate. Platform 20 and drive pulley 34 rotate about the same axis 44. Mounting arch 32 maintains a spaced relation between mounting plate and platform 20.

Figure 3:
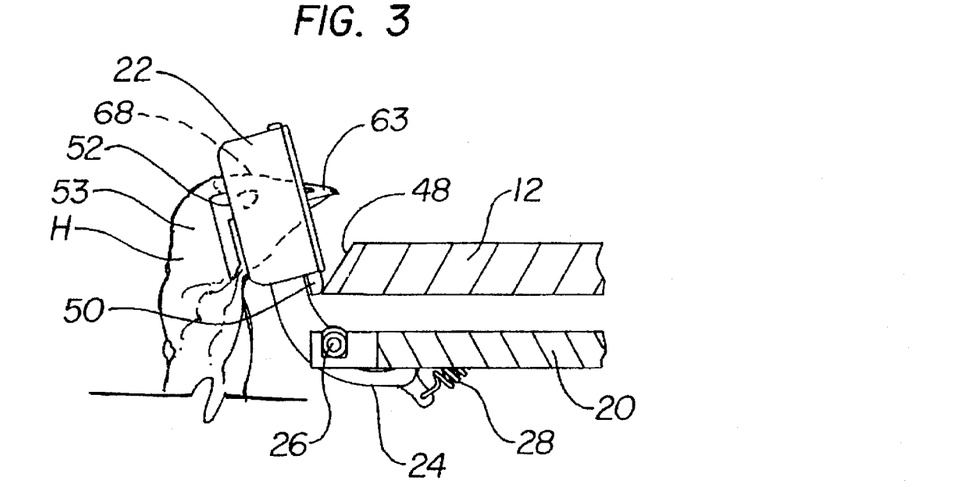
FIG. 3 is a detail section view taken at approximately 3—3 of FIG. 1.

As seen in FIG. 1, bird head positioning device 22 travels clockwise from mounting arch 32 to interface with loading trigger ramp 48. FIG. 3 illustrates trigger ramp 48 which acts as a cam surface bearing against cam follower 50 to pivot skin bunchers 52 engage the skin on bird's head. As poultry head H is placed into the bird head positioning device 22, cam follower 50 is urged into the engaged position causing skin bunchers 52 to engage retaining poultry head H. Skin bunchers 52 are pivoted on head positioning device 22 to bunch the poultry skin at the back of bird's head. Bunched skin 53 may be used for other processing operations such as liquid injection 14 or pellet injection 16.

Figure 4:
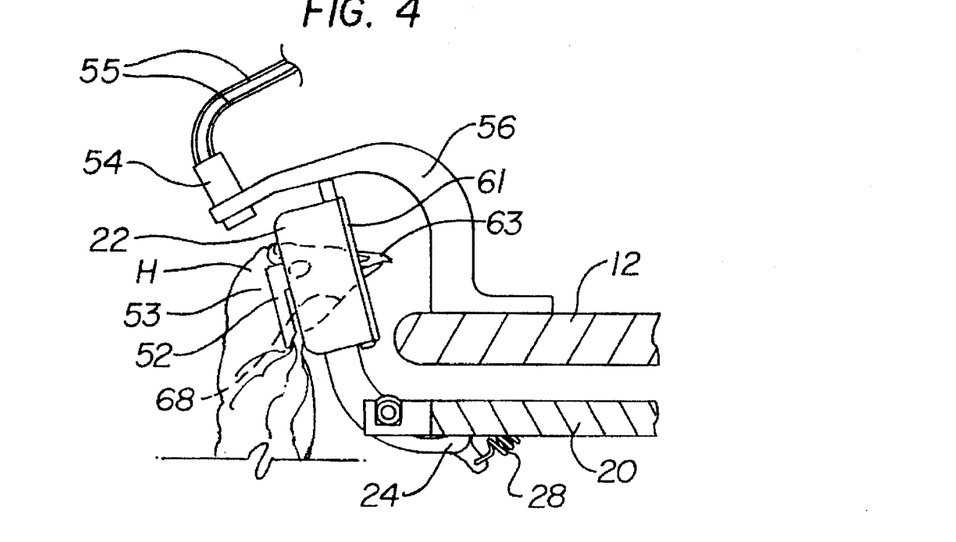
FIG. 4 is a detail section view taken at approximately 4—4 of FIG. 1.

As bird head positioning device 22 is moved on platform 20 with respect to mounting plate 12 poultry head H is detected by bird sensing module 54. As illustrated in FIG. 4, bird sensing module 54 is a capacitive moisture sensor module of the type manufactured by Omron, Turk, Banner and others. The detection of bird's head H by bird sensing module 54 causes an electrical signal on wires 55. Bird sensing module 54 is attached to mounting plate 12 by bird sensor support 56.

Figure 5:
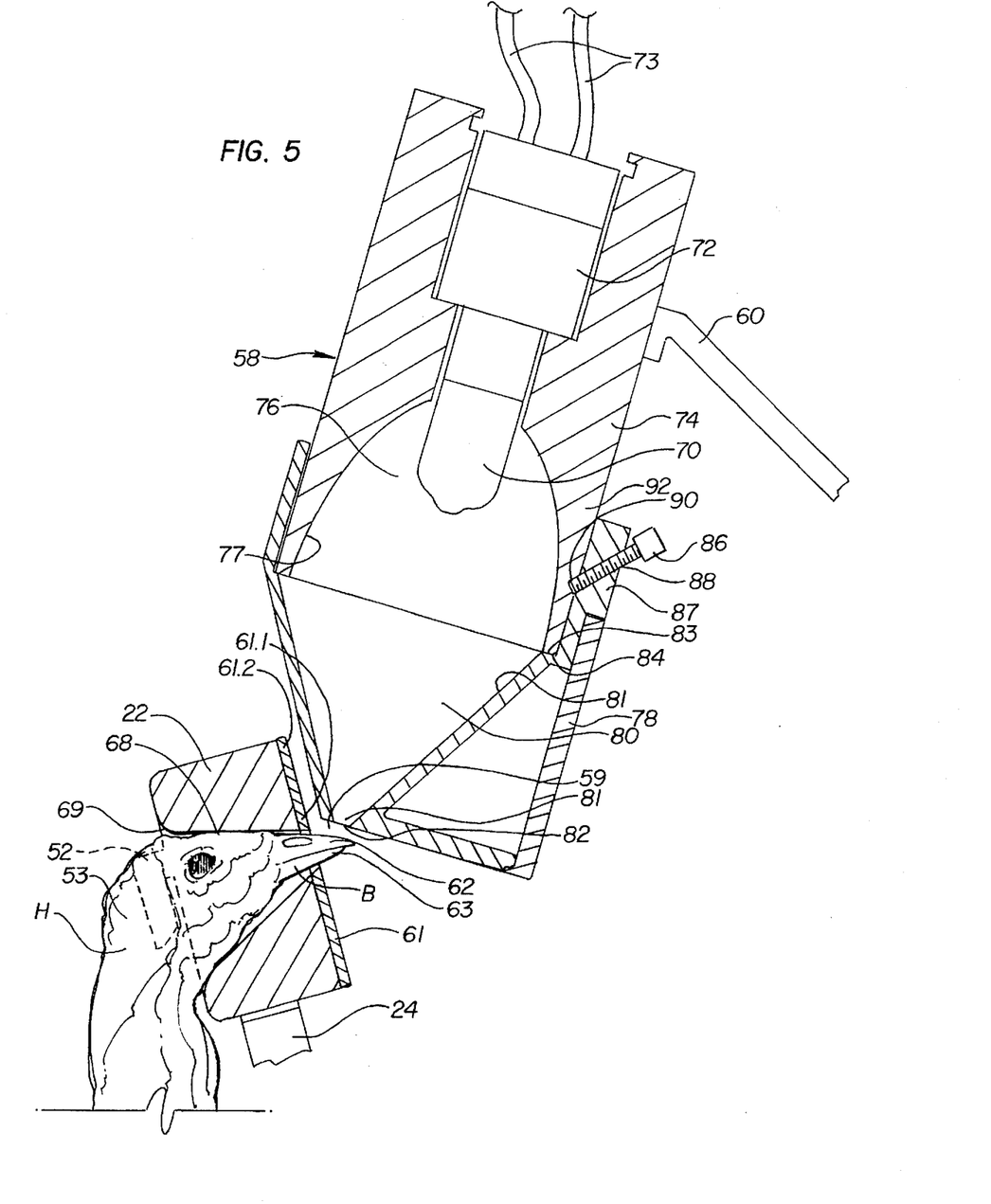
FIG. 5 is a detail section view taken at approximately 5—5 of FIG. 1.

As illustrated in FIG. 5, bird head positioning device 22 will cause bird's beak B to be interfaced with heating means shown as debeaking module indicated in general by the numeral 58 which transfers heat by non-contact convection or radiation thermal transfer. Debeaking module 58 is interfaced to mounting plate 12 by debeaking bracket 60. Debeaking bracket 60 is positioned to provide an air space shown as open space 59 between debeaking module 58 and beak locating adapter 61. Beak locating adaptor comprises an adapter portion 61.1 and a shielding portion 61.2. Debeaking module 58 contains means directing radiant energy creating heat onto the upper beak 62 through a non-contact thermal transfer such as reflection or convection causing the energy to penetrate the beak B. Debeaking module 58 directs the heat onto the upper portion of the beak thereby heating the beak from the outside in. The materials making up the bird's beak are translucent allowing the heat energy to penetrate through the outer layers of the beak to inner layers killing a portion of the the beak and destroying the beak's ability to convert soft tissues of the inner beak into the hard tissue. The rate of temperature rise in the beak is increased because the beak is translucent. Debeaking module 58 will debeak bird by affecting the structure of the beak B without contacting the beak as seen in the prior art.

Debeaking module 58 is positioned to allow upper beak 62 to shield lower beak 63 and poultry tongue from radiated energy. This technique allows minimal injury and trauma to bird. Beak locating adapter 61 is mounted on head positioning device 22. Beak receiving aperture 67 is formed in beak locating adapter 61 to allow closed beak B, including upper beak 62 and lower beak 63 to protrude from the head positioning device 22. Beak receiving aperture 67 has contour surfaces 68 to precisely position poultry beak B such that a predetermined portion of upper beak 62 is exposed to heat at debeaking station 14.

Bird head shaped opening 69 in head positioning device 22 is contoured to accept the front portion of a poultry head H while allowing the beak B to extend through beak receiving aperture 67. Bird head shaped opening 69 is specifically contoured to comfortably fit the poultry head H. Bird head positioning device 22 provides a shielding portion around the bird's head to prevent injury from the heat used at the debeaking module 58.

In the preferred embodiment, illustrated in FIG. 5, a 350 watt Tungsten bulb 70 is used as a source of high frequency heat generating radiation. A variety of energy emitting bulbs having a small size and comparable output may be used. It should be understood that a bulb with a compact filament area creates less ambient heat and is easier to focus on upper beak 62. A source of high frequency heat generating radiation is selected to have a wavelength which is reactive to a bird's beak. Infrared bulbs 70 having a wavelength of 700 nanometers to 1 millimeter are a preferred source of radiation. Debeaking module 58 has a high temperature, lamp socket 72 mounted in elliptical reflector body 74. High temperature lamp socket 72 is electrically connected to a power supply (not shown) by electrical conductors 73. Infrared bulb 70 is positioned in elliptical reflector cavity 76. Elliptical reflector cavity 76 has a polished elliptical surface 77 which is used to reflect the infrared radiation generated by infrared bulb 70. Elliptical reflector body 74 is attached to a radiation confining and transmitting housing 78 which has tapered passage 80 with polished surfaced 81 extending to electromagnetic radiation aperture 82. In the preferred embodiment, as shown in FIG. 5, radiation confining and transmitting housing 78 has a translucent window 85 mounted in aperture 82. Window 85 is used to seal the cavity defined by tapered passage 80 and elliptical reflector cavity 76 to prevent smoke or other contaminants and is transmissive to energy emitted from the bulb. Window 85 may be of sapphire, quartz or similar material. As can be seen in FIG. 5, electromagnetic radiation generated by infrared bulb 70 is reflected along polished elliptical surface 77 and tapered passage 80 to focus heat generated by bulb 70 on upper beak 62. Lower beak 63 is shielded from exposure to the electromagnetic radiation emitted through aperture 82.

FIG. 5 illustrates elliptical reflector body 74 mounted on radiation confining and transmitting housing 78. Radiation confining and transmitting housing 78 has mounting face 83 which mounts against mounting face 84 of elliptical reflector body 74. A thumb screw 86 is threadably mounted in mounting hole 88 of radiation confining and transmitting housing 78. Thumb screw 86 extends through wall 87 of radiation confining and transmitting housing 78 and into thumb screw seat 90 along peripheral wall 92 of elliptical reflector body 74. Thumb screw 86 extends into thumb screw seat 90 to secure elliptical reflector body 74 in radiation confining and transmitting housing 78.

Figure 6:
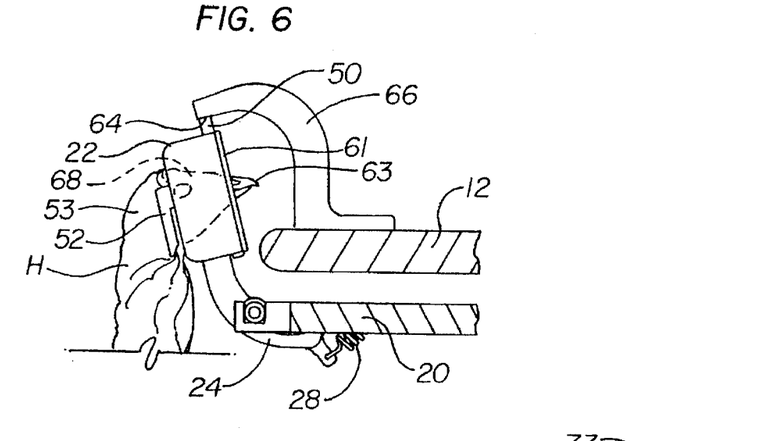
FIG. 6 is a detail section view taken at approximately 6—6 of FIG. 1.

Upon completion of processing, bird head positioning device 22 is rotated into the position shown in FIG. 6 where unload cam surface 64 bears against cam follower 50 to cause skin bunchers 52 to pivot into the disengage position. Unload cam surface 64 is mounted on mounting plate 12 by unload support 66. Bird head positioning device 22 is than rotated on platform 20 to receive a new bird at the load station shown in FIG. 3.

Figures 7, 8:
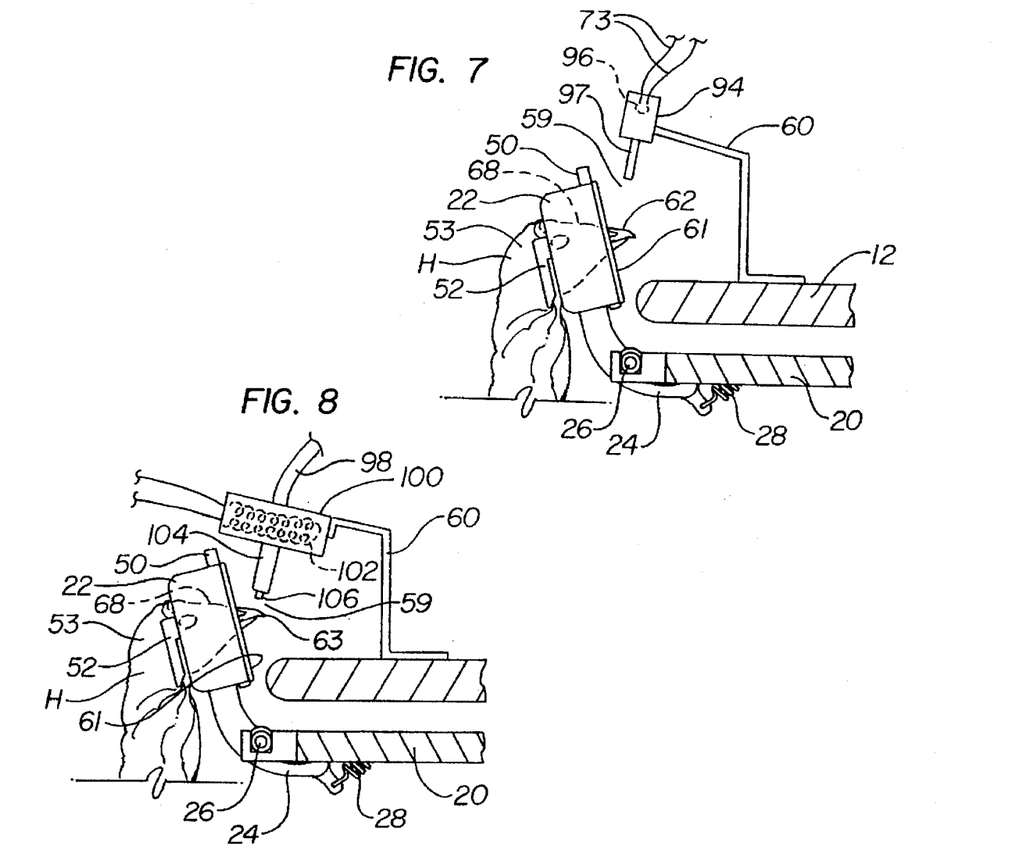
FIG. 7 is an alternative embodiment of the debeaking module showing a laser to direct radiated energy onto a portion of the bird's upper beak.
FIG. 8 is an alternative embodiment of the debeaking module showing a hot air delivery means for directing the heat.
Figure 9:
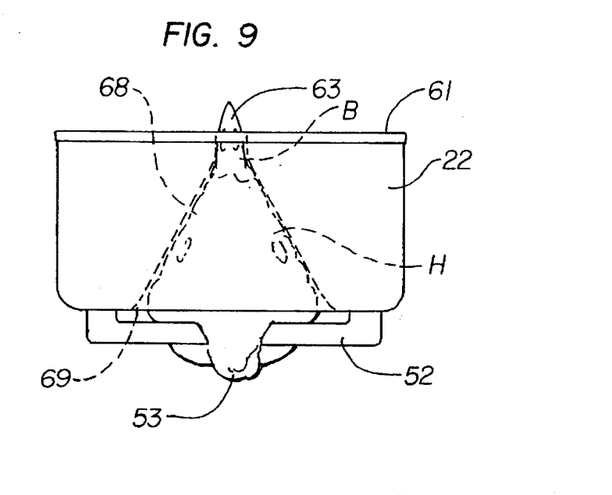
FIG. 9 is an elevated view of a bird head in the bird head positioning device with skin bunchers engaged.

FIG. 7 shows an alternative embodiment of the invention. The means directing the high frequency heat producing electromagnetic radiation is laser 94. The radiation is generated by laser bulb 96. In this implementation focusing tube 97 is aligned over poultry upper beak 62 to heat beak B through non-contact normal transfer. It should be understood that the use of open space 59 is an important feature in this embodiment as well. Laser bulb 96 is connected to a power supply (not shown) by electrical conductors 73.

In another alternative embodiment of the invention, FIG. 8 illustrates means directing heat onto the upper portion under the upper beak 62 comprising a hot gas. In this embodiment, a supply tube 98 is connected to a source of high pressure air. Supply tube 98 is also connected to a heat exchanger 100. A heat generating source, preferably an electric resistance element 102 is located in the heat exchanger 100. Heat generated by electrical element 102 is then used to heat the gas. Hot gas is then forced from the heat exchanger 100 out hot gas tube 104. Gas exiting at hot gas tube 104 may be in a temperature from 150° F. to 800° F. The preferred temperature range of this embodiment is between 450° and 550° F. This hot gas is then transferred to gas delivery duct 106 is mounted on platform 20. Duct 106 is aligned at debeaking station 14 to direct hot gas onto the poultry upper beak 62 as the bird head positioning device 22 interfaces with this debeaking module 58. Electrical element 102 is connected to power supply (not shown) by electrical conductor 73. It should be understood that open space 59 is maintained to provide heating of poultry upper beak 62 by non-contact thermal transfer through convection of the heat from electrical element 102.

In operation, the bird's head is placed in the head positioning device 22 which is than interfaced to the heating means to heat a portion of upper beak 62 by non-contact thermal transfer. The heating means as used here includes: (1) a bulb 70 generating high frequency electromagnetic radiation and a reflector 77 directing the radiated energy onto a portion of upper beak 62 as illustrated in FIG. 5; (2) a bulb 96 generating high frequency electromagnetic radiation and a laser 94 directing the radiated energy onto a portion of upper beak 62 as illustrated in FIG. 7, or; (3) a heat exchanger 100 having a heat source 102 therein and a hot gas directed from supply tube 98 through heat exchanger 100 thus heating the gas and forcing hot gas to exit tube 104 which directs the hot gas onto a portion the upper beak 62.

Figure 10:
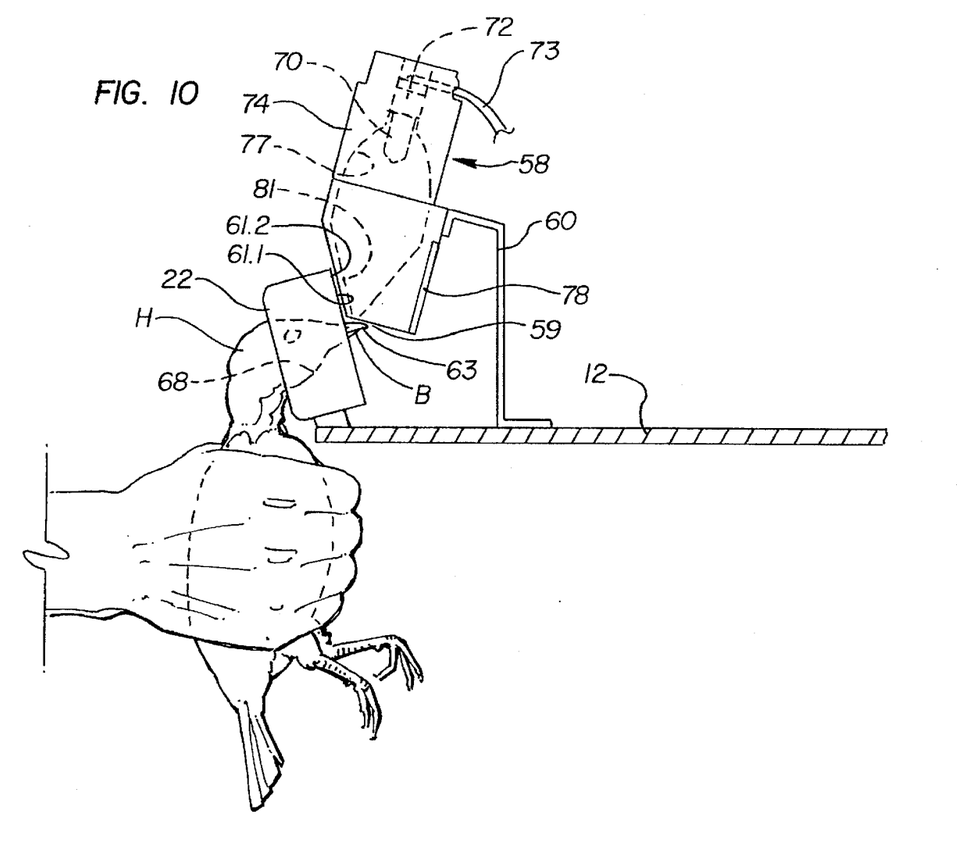
FIG. 10 is a perspective view of a debeaking apparatus mounted adjacent a bird head positioning device.

It should be understood, that in the invention described herein, debeaking module 58 and head positioning device 22 may be stationery with respect to each other, as shown in FIG. 10. Open space 59 is used to create a non-contact thermal transfer between the heating means and the portion of the upper beak 62. Debeaking module 58 is engaged to direct heat onto poultry upper beak for a period of time sufficient to effect the beak structure.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

In the claims:

1. An apparatus for debeaking a bird comprising:
   (a) a beak locating adaptor portion having a beak receiving aperture therein through which a bird's beak protrudes;
   (b) a bird head positioning device adjacent said adaptor portion to position a bird's head with the bird's beak protruding through the beak receiving aperture; and
   (c) a reflector for focusing a directional source of heat for applying heat to the portion of the bird's beak protruding through the beak receiving aperture said directional source of heat being separated from said beak, whereby said heat may be directed for non-contact thermal transfer to said beak.

2. The invention of claim 1 wherein the directional source of heat comprises a laser directing radiant energy onto the portion of the bird's beak protruding through the beak receiving aperture.

3. The invention of claim 1 further comprising:
   (a) a socket mounted in said reflector, an energy emitting bulb electrically connected to the socket, and elliptical reflector portion adjacent said energy emitting bulb to reflect energy in a predetermined direction; and
   (b) a radiation confining and transmitting housing having a front side and a tapering passage, a electromagnetic radiation aperture along the tapered passage and extending to the front side to thereby reflect the energy from the bulb to the electromagnetic radiation aperture.

4. An apparatus for debeaking a bird comprising:
   (a) a beak locating adaptor portion having a beak receiving aperture therein through which a bird's beak protrudes;
   (b) a bird head positioning device adjacent said adaptor portion to position a bird's head with the bird's beak protruding through said beak receiving aperture; and
   (c) a heating means for applying heat to the portion of the bird's beak protruding through the beak receiving aperture by non-contact thermal transfer, said heating means comprising a gas heating chamber, a heat source in the gas heating chamber, and a gas delivery duct discharging hot gas onto the portion of the bird's beak protruding through the beak receiving aperture.

5. An apparatus for debeaking a bird comprising:
   (a) a beak locating adaptor portion having a beak receiving aperture therein through which a bird's beak protrudes;
   (b) a bird head positioning device adjacent said adaptor portion to position a bird's head with the bird's beak protruding through said beak receiving aperture; and
   (c) a heating means for applying heat to the portion of the bird's beak protruding through the beak receiving aperture by non-contact thermal transfer, said heating means comprising an energy emitting bulb providing a source of radiant energy, a reflector focusing energy adjacent the beak receiving aperture for application to the bird's beak, wherein said heating means is electromagnetic comprising:
      i. a stationary means mounting said bulb; and
      ii. a conveyor means, intermittently and progressively moving along a predetermined course and mounting said beak locating adaptor and head positioning device, the conveyor means moving the adaptor and head positioning device to and away from the source of electromagnetic energy.

6. The invention of claim 5 further comprising an open space adjacent said beak locating adaptor portion and receiving the beak therein.

7. The invention of claim 6 wherein said open space is located between said heating means and said adaptor portion.

8. The invention of claim 5 further comprising a shielding portion adjacent said receiving aperture of said adaptor portion, said shielding portion being restrictive to transmission heating whereby to shield portions of the bird's head, adjacent the beak, against the effects of said thermal transfer.

9. The invention of claim 8 wherein said shielding portion is adjacent said bird head positioning device to reduce injury by said heating means to said bird.

10. The invention of claim 5 wherein the heating means is directed at an oblique angle to adaptor portion to apply heat only onto bird's upper beak protruding through the beak receiving aperture to thereby shield the lower beak and tongue from injury.

11. The invention of claim 5 wherein the bird head positioning device further comprises a beak locating adaptor.

12. An apparatus for debeaking a bird comprising:
   (a) a beak locating adaptor portion having a beak receiving aperture therein through which a bird's beak protrudes;
   (b) a bird head positioning device adjacent said adaptor portion to position a bird's head with the bird's beak protruding through said beak receiving aperture;
   (c) a heating means for applying heat to the portion of the bird's beak protruding through the beak receiving aperture by non-contact thermal transfer, the heating means comprising an energy emitting bulb providing a source of radiant energy, a reflector focusing energy adjacent the beak receiving aperture for application to a bird's beak, said reflector having a socket mounted therein, said energy emitting bulb electrically connected to the socket, the reflector having an elliptical reflector portion adjacent said energy emitting bulb to reflect energy in a predetermined direction;

(d) a radiation confining and transmitting housing having a front side and a tapering passage, an electromagnetic radiation aperture along the tapered passage and extending to the front side to thereby reflect the radiant energy from the bulb to the electromagnetic radiation aperture; and (e) a translucent window in the electromagnetic radiation aperture, the translucent window being transmissive to energy emitted from the bulb to thereby minimize smoke and other contaminants which enter the tapered passage through electromagnetic radiation aperture.

13. A method of debeaking poultry comprising:

(a) generating high frequency heat producing radiation;

(b) directing such radiation onto portions of the bird's upper beak adjacent the tip of the beak across an air space; and (c) shielding other portions of the bird's upper beak and head from such radiation, wherein the directing is obtained by heating a gas and delivering the heated gas onto the portion of the bird's upper beak.

14. The method of claim 13 wherein said directing of high frequency heat producing radiation is only onto the bird's upper beak.

15. An apparatus for debeaking a bird comprising:

(a) a beak locating adaptor portion having a beak receiving aperture therein through which a bird's beak protrudes;

(b) a bird head positioning device adjacent said adaptor portion to position a bird's head with the bird's beak protruding through said beak receiving aperture; and (c) a heating means for applying heat to the portion of the bird's beak protruding through the beak receiving aperture by non-contact thermal transfer, said heating means comprising an energy emitting bulb providing a source of radiant energy, a reflector focusing energy adjacent the beak receiving aperture for application to the bird's beak, said heating means being electromagnetic further comprising:

i. a stationary means mounting said adaptor and head positioning device; and ii. a conveyor means intermittently progressively moving along a predetermined course and mounting said bulb, the conveyor means moving the bulb to and away from the adaptor and head positioning device.

16. An apparatus for debeaking a bird comprising:

(a) a bird head positioning device with a beak locating adaptor portion and a shielding portion, a bird head shaped opening in the bird head positioning device to receive a bird's head, a beak receiving aperture in said opening through which a bird's beak protrudes;

(b) a debeaking module having a reflector surface therein, an infrared bulb mounted in said debeaking module along said reflect surface to generate infrared energy, a radiation confining and transmitting housing having an electromagnetic radiation aperture and a tapered passage extending from said reflector surface to said electromagnetic radiation aperture, a translucent window on the debeaking module transmissive to infrared energy to thereby minimize smoke and other contaminants which enter the tapered passage through the electromagnetic radiation aperture; and (c) an open space between said electromagnetic radiation aperture and said beak receiving aperture to thereby transmit infrared energy from said infrared bulb through said electromagnetic radiation aperture and across said open space to apply heat to a beak protruding from said beak receiving aperture through non-contact thermal transfer.

17. The invention of claim 16 further comprising:

a means for directing said energy through said open space at an oblique angle relative to said beak locating adaptor.

18. The apparatus of claim of 17 wherein the means for directing the energy further comprises:

(a) a reflector having a bulb socket therein adjacent said beak locating adaptor, said energy emitting bulb electrically connected to said socket to thereby generate and reflect energy from the bulb at an oblique angle to said adaptor.

19. The invention of claim 17 wherein the bird head positioning device further comprises a pair of skin bunchers to bunch skin on the back of a bird's head.

20. The invention of claim 17 wherein the energy emitting bulb is infrared having a wave length between 700 nanometers and 1 millimeter.

21. The invention of claim 16 wherein the beak receiving aperture has a contoured surface to thereby define the portion of a poultry beak which protrudes therefrom.

22. The invention of claim 16 wherein the infrared bulb is selected having a wavelength which is reactive to a poultry beak.

23. The invention of claim 16 wherein the debeaking module directs the infrared energy at an oblique angle relative to the beak locating adapter portion.

24. The invention of claim 16 wherein the debeaking module directs the infrared energy onto an upper beak.

25. The invention of claim 16 wherein the bird head positioning device further comprises a pair of skin bunchers against the head shaped opening to thereby bunch a portion of bird skin on said bird head.

26. A method of processing a bird having a head and a beak comprising:

(a) producing a beak heating media comprising a focused beak-treating radiant energy directionally transmissible through an open space;

(b) positioning and orienting the bird's head and locating the bird's beak in a portion of a beak-treating open space; and (c) transmitting and directing the beak heating media through a portion of the beak-treating open space and onto the bird's beak.

27. The method of claim 26 wherein the beak-treating radiant energy is high frequency heat producing radiation being generated as infrared.

28. The method of claim 26 wherein the beak-treating radiant energy is obtained by a laser.

29. A method according to claim 26 wherein said producing step comprises producing a beak heating hot gas directionally transmissible through an open space.

* * * * *